(12) United States Patent
Hossfeld

(10) Patent No.: US 12,194,971 B2
(45) Date of Patent: Jan. 14, 2025

(54) METHOD FOR DETERMINING A ROTATION ANGLE SIGNAL OF A DC MACHINE, AND BRAKING SYSTEM AND PROGRAM CODE

(71) Applicant: ZF Active Safety GmbH, Koblenz (DE)

(72) Inventor: Alexander Hossfeld, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 264 days.

(21) Appl. No.: 17/849,886

(22) Filed: Jun. 27, 2022

(65) Prior Publication Data

US 2022/0410862 A1    Dec. 29, 2022

(30) Foreign Application Priority Data

Jun. 29, 2021 (DE) .......................... 102021116760.4

(51) Int. Cl.
| | |
|---|---|
| B60T 13/74 | (2006.01) |
| F16D 55/226 | (2006.01) |
| G01P 3/48 | (2006.01) |
| H02K 11/21 | (2016.01) |

(52) U.S. Cl.
CPC .......... B60T 13/741 (2013.01); F16D 55/226 (2013.01); G01P 3/48 (2013.01); H02K 11/21 (2016.01); *B60T 2270/402* (2013.01); *B60T 2270/413* (2013.01)

(58) Field of Classification Search
CPC ............. B60T 13/741; B60T 2270/402; B60T 2270/413; F16D 55/226; G01P 3/48; G01P 3/4802; G01P 3/487; H02K 11/21
See application file for complete search history.

(56) References Cited

U.S. PATENT DOCUMENTS

| | | | |
|---|---|---|---|
| 9,813,002 B2 * | 11/2017 | Moriyama | ................ H02P 7/06 |
| 10,137,878 B2 * | 11/2018 | Ritter | .................... B60T 13/741 |
| 10,737,673 B2 * | 8/2020 | Nakaoka | ............... B60T 13/741 |

* cited by examiner

*Primary Examiner* — Hung Q Nguyen
*Assistant Examiner* — Mark L. Greene
(74) *Attorney, Agent, or Firm* — Kristin L. Murphy

(57) ABSTRACT

In order to determine a rotation angle signal of a DC machine precisely, reliably and in a simplified manner, a method is proposed, wherein combining of a current signal of the DC machine and a voltage signal of the DC machine is used to determine a combined signal; wherein conditioning of the combined signal is used to determine a conditioned signal; and wherein a rotation angle signal is determined by analysing signal oscillations of the conditioned signal.

14 Claims, 3 Drawing Sheets

METHOD FOR DETERMINING A ROTATION ANGLE SIGNAL OF A DC MACHINE, AND BRAKING SYSTEM AND PROGRAM CODE

CROSS-REFERENCE TO RELATED APPLICATION

This application claims priority to German Priority Application No. 102021116760.4, filed Jun. 29, 2021 and German Patent Application No. 102021127054.5, filed Oct. 19, 2021, the disclosure of which is incorporated herein by reference in its entirety.

TECHNICAL FIELD

The disclosure relates to a method for determining a rotation angle signal of a DC machine. Further, the disclosure is aimed at a braking system for a motor vehicle. The disclosure also relates to program code containing commands that cause the braking system to perform the method according to the disclosure.

BACKGROUND

DC machines are rotating electrical machines that are operated with DC current or produce DC current. Depending on the direction of the flow of power, a distinction is drawn between the motor operating range and the generator operating range. In the motor mode, electrical energy is supplied and mechanical energy is drawn; conversely, in the generator mode, mechanical energy is supplied and electrical energy is drawn. DC machines can start under load, and their speed is easy to change.

One field of application of a DC machine is use as a drive motor in an electric-motor actuator of a braking system for a motor vehicle, for example, in order to perform parking braking. This is because, here, actuation of the DC machine by an appropriate electronic control unit ensures that a brake pad transmits a predetermined brake force to a brake disc.

In order to be able to determine an operating position of the electric-motor actuator, such as for parking braking, it is essential to be able to determine a rotation angle signal of the DC machine. This is because the more accurately this rotation angle signal can be determined, the more precisely the electric-motor actuator can be moved to a specific operating position.

Previous methods for determining the rotation angle of DC machines are relatively susceptible to error, complex and/or imprecise, however. By way of example, it is known practice to use sensors to determine the rotation angle, which requires additional hardware and evaluation electronics. It is also known practice to count signal oscillations of the motor current in order to draw conclusions about the rotation angle of the DC machine. However, counting signal oscillations does not allow precise determination of the rotation angle in the generator operating range of the DC machine on account of signal interference that occurs in practice.

Against this background, what is needed is a method that allows a rotation angle signal of a DC machine to be determined precisely, reliably and in a simplified manner.

SUMMARY

A method is disclosed, wherein combining of a current signal of the DC machine and a voltage signal of the DC machine is used to determine a combined signal; wherein conditioning of the combined signal is used to determine a conditioned signal; and wherein the rotation angle signal is determined by analysing signal oscillations of the conditioned signal.

A braking system for a motor vehicle is additionally provided, said braking system comprising an electronic control unit and at least one wheel brake having an associated electric-motor actuator. The actuator comprises a DC machine configured to operate the wheel brake, for example for parking braking. The control unit is configured to control or regulate the DC machine and to perform the steps of the method according to the disclosure.

Since the method according to the disclosure allows very precise determination of the rotation angle, there is the significant advantage that it is likewise possible to very accurately determine the travel ranges of the wheel brake, that is to say the operating position of the brake pads of the wheel brake in relation to a brake disc, in order to determine the wear on the brake pads, inter alia. In addition, it is possible to adjust the so-called clearance of the brake pads so accurately that residual grinding torques are reliably avoided. Furthermore, the contact force of the brake pads can be adjusted much more accurately, since it is directly dependent on the elasticities and the travel range of the brake pads.

Also provided is a program code containing commands that, when executed by the electronic control unit, cause the braking system described above to perform the method that is likewise described.

BRIEF DESCRIPTION OF DRAWINGS

Advantages, details and features of the disclosure are explained below with reference to the figures, in which.

DETAILED DESCRIPTION

Figure 1:
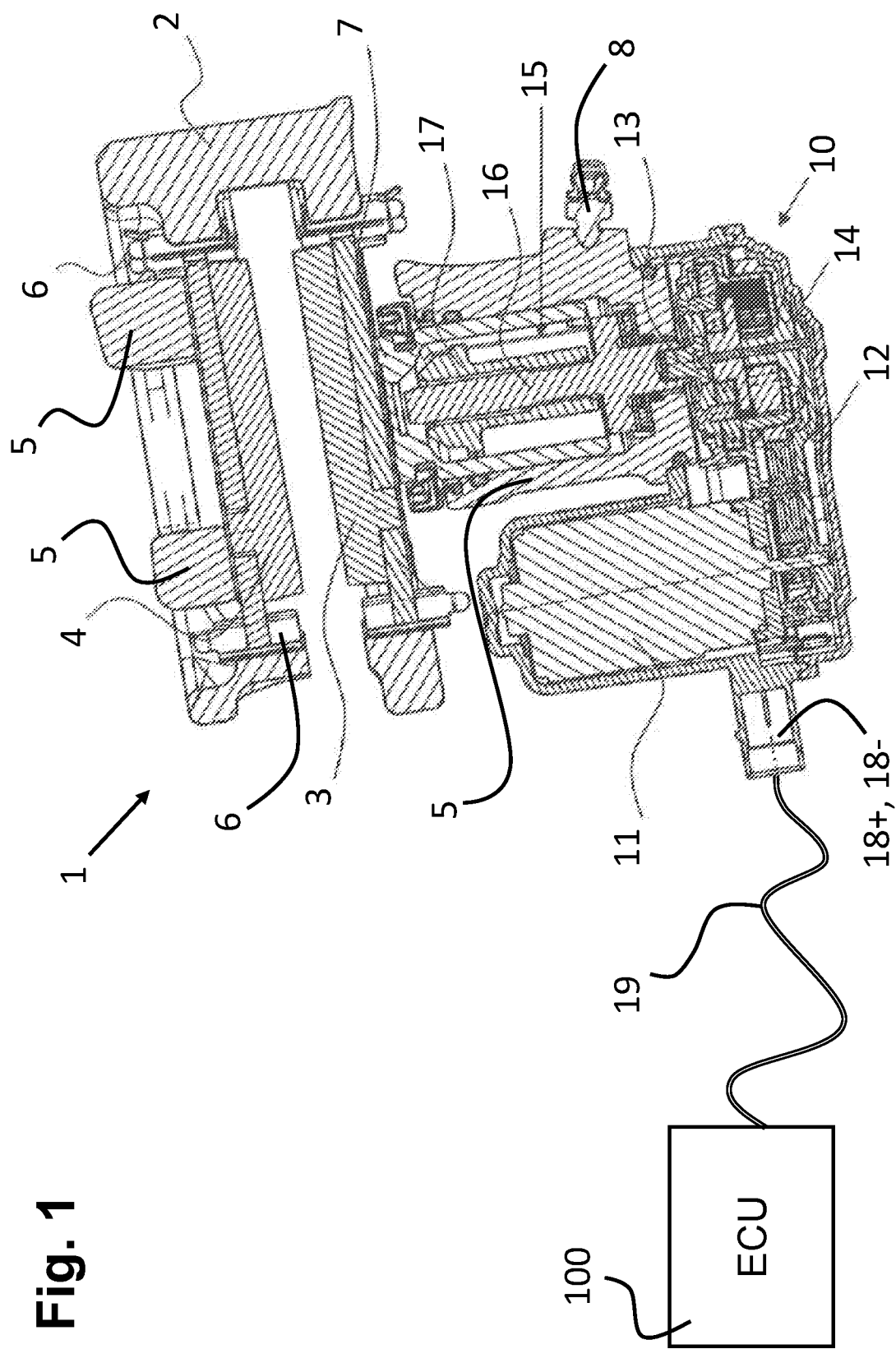
FIG. 1 shows a cross section through a wheel brake of a motor vehicle with electromechanical operation.

As one example, FIG. 1 shows a cross section through a wheel brake 1 of a motor vehicle.

This wheel brake 1 comprises a brake support 2, in which an inner brake pad 3 and an outer brake pad 4 are accommodated. The brake pads 3 and 4 interact in a known manner with a brake disc, not shown in more detail here, which is arranged between the brake pads 3 and 4. The brake disc that is not shown in more detail here is nonrotationally coupled to a wheel of the motor vehicle in a known manner, and is thus associated with a specific wheel of the motor vehicle.

The wheel brake 1 shown in FIG. 1 works on the basis of the "floating caliper" principle. To this end, a substantially U-shaped brake caliper 5 is mounted on the brake support 2 in a floating manner by guide elements 6. On the side facing the inner brake pad 3, a brake piston 7 is accommodated in the housing of the brake caliper 5 in a displaceable manner and acts directly on the inner brake pad 3. On a side facing the outer brake pad 4, the brake caliper 5 engages directly on the outer brake pad 4. When the brake piston 7 is operated, the inner brake pad 3 is pushed in a direction of the brake disc, as a result of which the brake caliper 5 is displaced in an opposite direction, which means that the outer brake pad 4 is also pushed (or—to put it another way—pulled) against the brake disc. The bilateral pushing, or pressing, of the brake pads 3 and 4 against the brake disc produces a frictional effect that, depending on the contact force brought about by the brake piston 7, adjusts a brake force at the associated wheel.

In the case of the wheel brake 1, the brake piston 7 can be operated hydraulically and/or electromechanically in order to adjust a brake force.

For hydraulic operation, which is used primarily for service braking, the brake piston 7 is displaced by a hydraulic pressure that is produced in a braking system, not shown in more detail here, of the motor vehicle and that is introduced via a hydraulic connection 8. This hydraulic pressure can be provided by a driver by operating a brake pedal (if necessary with the support of an electropneumatic, electrohydraulic or electromechanical brake force amplifier) in a master brake cylinder and/or by an electrohydraulic brake pressure generator, that is to say also independently of operation of the brake pedal by the driver.

For electromechanical operation, which is used primarily for parking braking, the wheel brake 1 comprises an electric-motor actuator 10, which is arranged on the housing of the brake caliper 5. The actuator 10 comprises a drive motor 11 for producing a torque, which is transmitted to a drive element 13 via an interposed gear unit 12. In one exemplary arrangement, the gear unit 12 is in the form of a multistage reduction gear, which can comprise a planetary gear 14, for example, in order to produce a high reduction, for example in an order of magnitude of 200:1, and hence a high brake force.

The drive element 13 is coupled to a worm gear 15 that interacts with the brake piston 7 and that converts the rotational movement of the drive element 13 into a linear movement for displacing the brake piston 7. The worm gear 15 can comprise a "nut/spindle" arrangement that is designed for example such that the spindle 16 is rotationally driven by the drive element 13 in order to linearly displace the nut 17 and hence the brake piston 7.

In order to control or regulate the drive motor 11, or the electric-motor actuator 10, there is provision for an electronic control unit 100, also referred to as an ECU. The control unit 100 may be integrated in the electric-motor actuator 10, or, as shown in FIG. 1, may be connected to the electric-motor actuator 10, or the drive motor 11, by way of an electrical line 19. For this purpose, the electric-motor actuator 10, or the drive motor 11, has electrical connections 18+ and 18−.

The electronic control unit 100 may be a separate control unit or may be integrated in a control unit that is present in the motor vehicle anyway, for example in a control unit of the braking and/or steering and/or drive system of the motor vehicle.

The electronic control unit ensures that the drive motor 11 is moved to a specific operating position at a specific time, for example when the parking brake is operated. To this end, an appropriate operating voltage is applied to the drive motor 11 and the operating current is varied, for example by an appropriate pulse width modulation, in order to control or regulate the rotation angle and the rotation speed of the drive motor 11.

The drive motor 11 shown in FIG. 1 is a permanent-field DC machine, that is to say a rotating electrical machine, that is operated with DC current in the motor mode or that produces DC current in the generator mode.

Such a DC machine has two electrical connections and comprises a fixed component, namely a stator, a rotatable component, namely a rotor, and a pole changer, namely a commutator.

Normally, the rotor is surrounded by the stator and separated only by an air gap. The stator comprises at least one pair of poles, which is formed by permanent magnets in order to produce a magnetic field. The rotor, which is also referred to as the armature, comprises at least one electrical coil element, which is arranged within the magnetic field of the stator in such a way that the Lorentz force brings about a torque for the rotor. The windings of the at least one coil element—armature winding, for short—are connected to the electrical connections of the DC machine via the commutator.

The commutator comprises at least two commutator segments that are rotatable with the rotor. The commutator segments are electrically insulated from one another and electrically connected to the armature winding. Additionally, the commutator comprises at least one pair of sliding contacts, namely at least one pair of brushes, which is fixed. The at least one pair of brushes bears against the commutator segments and is connected to the electrical connections of the DC machine. The at least one pair of brushes is arranged in such a way that, during one rotation of the rotor, the polarity of the armature winding is flipped such that current in an applicable direction is always flowing through those sections of the armature winding that move transversely or ideally at right angles with respect to the magnetic field of the stator, in order to achieve as great an effect of the Lorentz force as possible.

Figure 2:
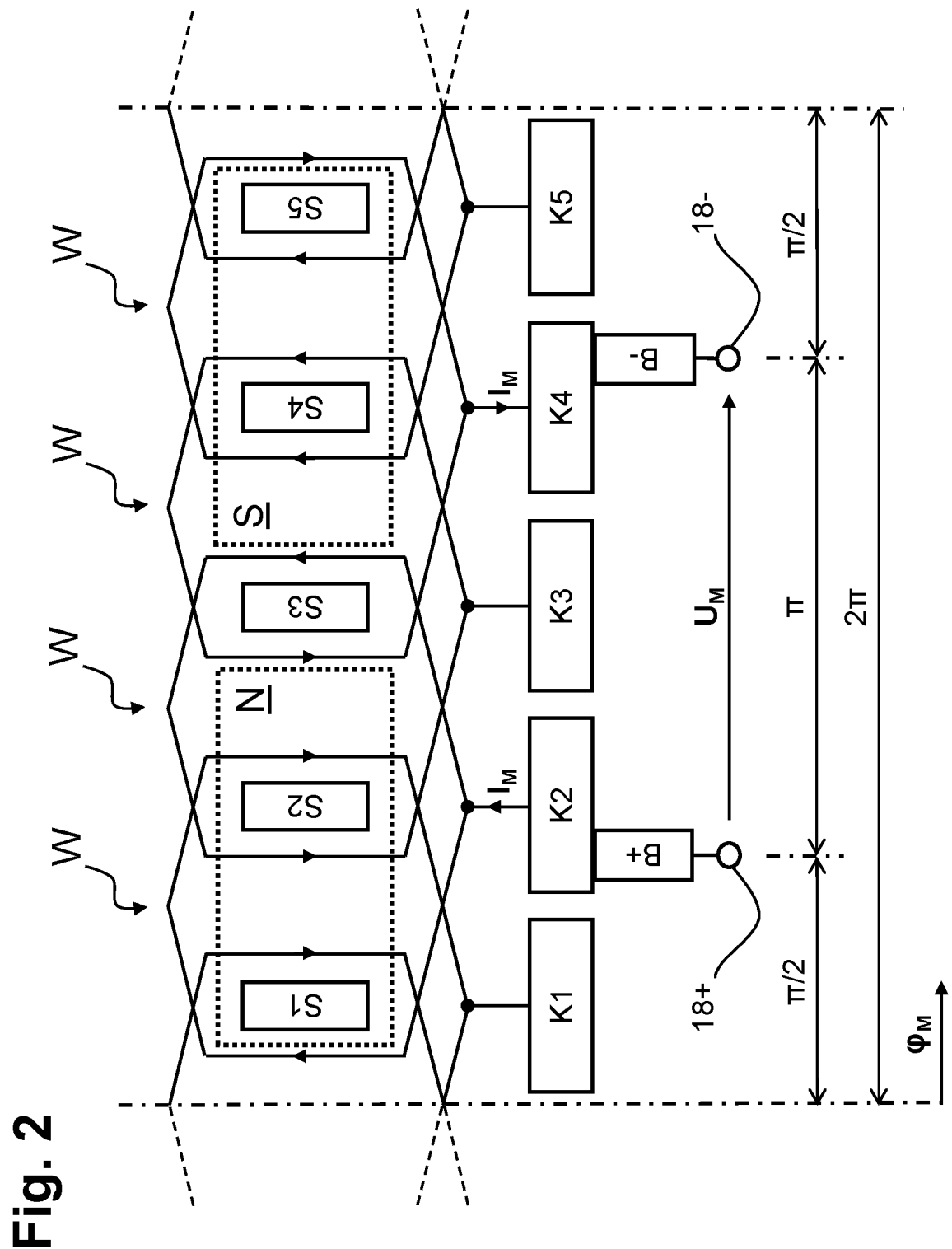
FIG. 2 shows a winding diagram of a permanent-field DC machine.

As one example, FIG. 2 shows a winding diagram of a permanent-field DC machine.

The stator of this DC machine comprises a pair of poles N, S for producing a magnetic field. The rotor of this DC machine comprises five coil elements S1-S5, which are arranged in an evenly distributed manner in relation to a total angle $2\pi$ of the rotor and which are arranged within the magnetic field produced by the pair of poles N, S. The rotatable portion of the commutator of this DC machine comprises five commutator segments K1-K5, which are arranged in an evenly distributed manner in relation to the total angle $2\pi$ of the commutator, or of the rotor. The fixed portion of the commutator of this DC machine comprises a pair of brushes B+, B−, which is arranged in an evenly distributed manner in relation to the total angle $2\pi$ of the commutator, with the result that the distance between the brushes B+ and B− corresponds to the angle $\pi$. The armature winding W of the coil elements S1-S5 is electrically connected to the commutator segments K1-K5. The brushes B+ and B− are electrically connected to the electrical connections 18+ and 18− of the DC machine.

At a rotation angle $\varphi_M$ shown in FIG. 2 for the DC machine, the brush B+ is in contact with the commutator segment K2 and the brush B− is in contact with the commutator segment K4. When an operating voltage $U_M$ is applied to the brushes B+ and B−, or to the connections 18+ and 18−, an operating current $I_M$ flows via the armature winding as depicted by the current direction arrows. From this, it is also possible to see the type of armature winding for the coil elements S1-S5; as such, this is a "crossed lap winding", which has the advantage that only two brushes B+ and B− are required.

Figure 3:
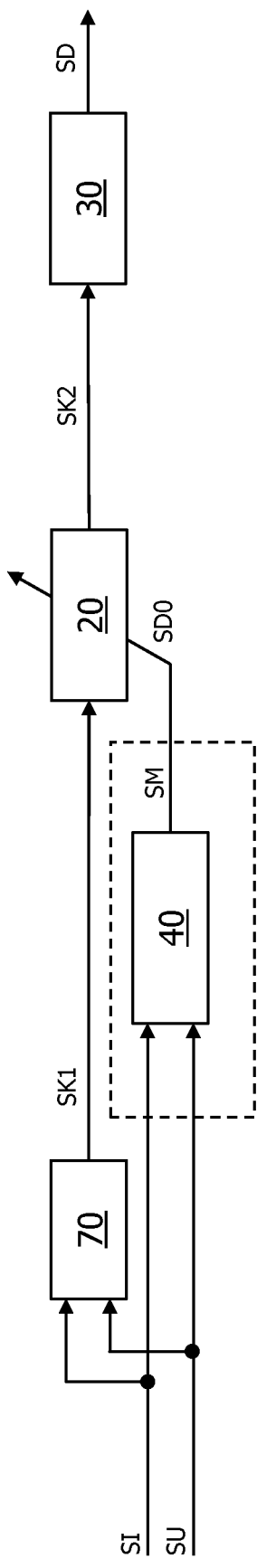
FIG. 3 shows a method for determining a rotation angle signal of a DC machine according to a first exemplary arrangement.

FIG. 3 schematically shows a method according to a first exemplary arrangement as a block diagram. As inputs, the method uses a current signal SI of the DC machine 11 and a voltage signal SU of the DC machine 11. As output, the method provides a rotation angle signal SD of the DC machine 11.

In a block 70, "combining of the current signal SI and the voltage signal SU" is used to determine a combined signal SK1. In a block 20, "conditioning of the combined signal SK1" is used to determine a conditioned signal SK2. In a block 30, the rotation angle signal SD is determined by "analysing signal oscillations of the conditioned signal SK2".

The "combining of the current signal SI and the voltage signal SU" in block 70 in order to determine the combined signal SK1 can comprise changing over between the current signal SI and the voltage signal SU, the changeover being affected on the basis of the type of operation of the DC machine. Since the DC machine is operated at a specific voltage or in a specific voltage range, that is to say that the signal value of the voltage signal SU has a constant or substantially constant characteristic, the voltage signal SU may have no distinctly analysable signal oscillations in the motor mode, whereas the voltage signal SU has distinctly analysable signal oscillations in the generator mode on account of the induced voltage. In contrast to the voltage signal SU, the current signal SI may have distinctly analysable signal oscillations only in the motor mode, since the signal value of the current signal SI is zero or substantially zero in the generator mode. Therefore, the changeover is effected in such a way that the combined signal SK1 corresponds to the current signal SI during a motor mode and to the voltage signal SU during a generator mode.

Furthermore, the "combining of the current signal SI and the voltage signal SU" in block 70 in order to determine the combined signal SK1 can comprise one of the mathematical operations addition, subtraction, multiplication and division, or combinations of these mathematical operations, in order to combine individual signal values of the current signal SI and the voltage signal SU for the respective times.

If application of these mathematical operations does not result in a changeover between the current signal SI and the voltage signal SU being applied, the information to be analysed regarding the commutation frequency is always contained in the combined signal SK1. In one exemplary arrangement, the combined signal SK1 is a summed signal formed by adding the current signal SI and the voltage signal SU.

In addition, the "combining of the current signal SI and the voltage signal SU" in block 70 in order to determine the combined signal SK1 can comprise a normalization of the current signal SI and/or the voltage signal SU, for example in order to align the amplitudes of the signal oscillations of the current signal SI and the voltage signal SU with one another. In one exemplary arrangement, this is accomplished by multiplying the current signal SI and/or the voltage signal SU by a respective normalization factor. The normalization turns the combined signal SK1 into a unitless signal.

The "conditioning of the combined signal SK1" in block 20 in order to determine the conditioned signal SK2 can comprise a bandpass filtering, which lets through only signals in a specific frequency band and blocks or significantly attenuates signals below and above the passband, in order to filter out interference in the combined signal SK1. In one exemplary arrangement, the centre frequency and the bandwidth around the centre frequency of the passband are adjusted such that during operation of the DC machine 11 the commutation frequency of said DC machine is within the passband.

Since the speed of the DC machine 11 is variable, the conditioning of the combined signal SK1 in block 20 can be effected on the basis of an estimated rotation angle signal SD0, which may be an estimated rotation frequency or rotation speed of the DC machine 11, for example. An "adaptive" bandpass filtering thus takes place. To this end, in one exemplary arrangement, the centre frequency of the bandpass filter is adjusted on the basis of the estimated rotation angle signal SD0 and a specific bandwidth B0 around the centre frequency is predefined that determines the passband of the bandpass filter.

So that the commutation frequency of the DC machine 11 is within the passband of the band filter during operation of the DC machine, the estimated rotation angle signal SD0 is subjected to a scaling. This is accomplished by multiplying the estimated rotation angle signal SD0 by a scaling factor. If the estimated rotation angle signal SD0 is present as a rotation frequency, for example, then the commutation frequency that applies to the DC machine 11 is obtained by multiplying by the number of commutation segments and the number of brushes of the DC machine 11. If the DC machine 11 has 5 (five) commutation segments and 2 (two) brushes, for example, a scaling factor of 10 (ten) is obtained. In this case, the centre frequency of the bandpass filter is thus set to a value that is 10 times as great as the estimated rotation frequency of the DC machine 11.

In a block 40, the estimated rotation angle signal SD0 is determined by modelling the current signal SI and the voltage signal SU. In one exemplary arrangement, this is accomplished by applying a mathematical model of the DC machine 11, which model can be used to estimate a rotation angle signal SD0 on the basis of the current signal SI and the voltage signal SU and also known parameters, such as the motor constant $K_M$ of the DC machine 11 and the total resistance $R_G$ obtained from the line/contact resistances and the internal resistance of the DC machine 11. By way of example, a present angular speed ω can be determined for both a present signal value I of the current signal SI and a present signal value U of the voltage signal SU according to the formula $$\omega = (U - R_G * I)/K_M.$$

The present angular speed ω of the DC machine 11 can then be converted in a known manner into the present rotation frequency of the DC machine 11, which represents the estimated rotation angle signal SD0.

The "analysing of signal oscillations of the conditioned signal SK2" in block 30 in order to determine the rotation angle signal SD comprises a detection and a counting of the signal oscillations that occur in the conditioned signal SK2 in order to take these as a basis for determining the rotation angle signal SD. This can be accomplished by detecting and counting the signal maxima, signal minima and/or signal zero crossings that occur in the conditioned signal SK2 within a specific period of time, for example. Since the conditioned signal SK2 is based on the commutation frequency of the DC machine, determining the rotation angle signal SD results in a rescaling being performed. In one exemplary arrangement, this is accomplished by multiplying by a rescaling factor that corresponds to the reciprocal value of the scaling factor of the DC machine 11 that was explained above. A scaling factor of 10 (ten) therefore results in a division by 10 (ten) being carried out when determining the (final) rotation angle signal SD.

Figure 4:
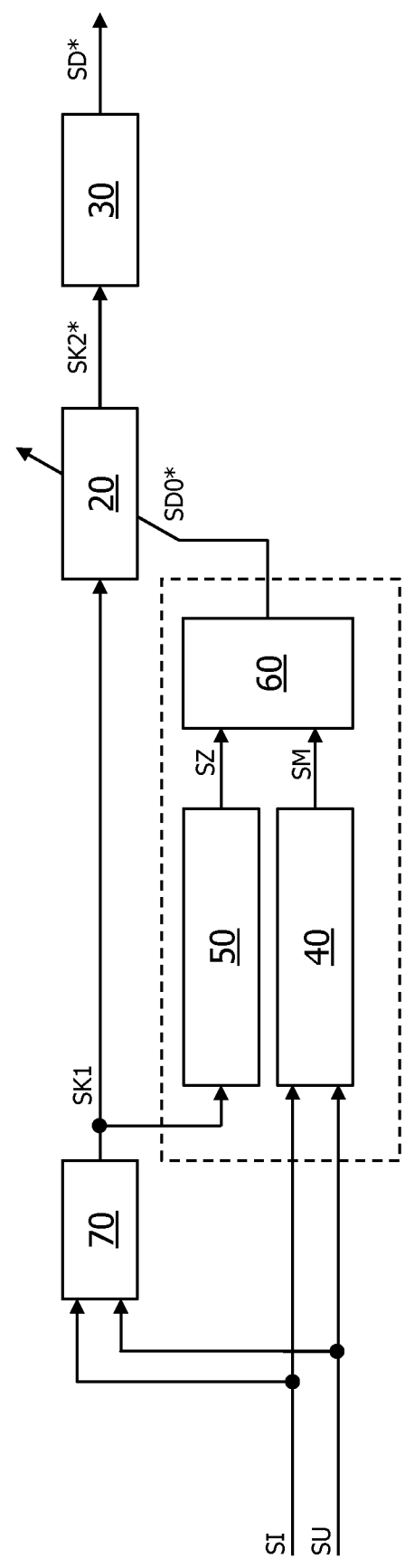
FIG. 4 shows a method for determining a rotation angle signal of a DC machine according to a second exemplary arrangement.

FIG. 4 schematically shows a method according to a second exemplary arrangement as a block diagram. In this case, the signals SI, SU and SK1 and the functionality of blocks 20, 30, 40 and 70 are identical to the first exemplary arrangement in FIG. 3. There is a resultant improved quality of the signals SD0, SK2 and SD compared to the first exemplary arrangement in FIG. 3, and these signals are therefore denoted by a "*". In addition, blocks 50 and 60 are added compared to the first exemplary arrangement in FIG. 3.

In block 40, modelling of the current signal SI and the voltage signal SU is initially used to determine a modelled signal SM, which corresponds to the estimated rotation angle signal SD0 according to the first exemplary arrangement in FIG. 3.

In block 50, "preprocessing of the combined signal SK1" is used to determine an intermediate signal SZ. In block 60, "combining of the modelled signal SM and the intermediate signal SZ" is used to determine the estimated rotation angle signal SD0*.

The "preprocessing of the combined signal SK1" in block 50 in order to determine the intermediate signal SZ can comprise a spectral analysis, for example a discrete-time Fourier transformation, in order to determine the frequency spectrum of the combined signal SK1 and to provide it as an intermediate signal SZ. The intermediate signal SZ is therefore a discrete-time vector signal representing the frequency spectrum of the combined signal SK1, that is to say the distribution of the amplitudes of the respective frequency components as a function of the frequency.

The "combining of the modelled signal SM and the intermediate signal SZ" in block 60 in order to determine the "more accurately" estimated rotation angle signal SD0* can comprise the following:

The intermediate signal SZ, or the vector signal, is examined for the frequency component having the maximum amplitude, which corresponds to the commutation frequency of the DC machine 11. This is done on the basis of the modelled signal SM, which already corresponds to an estimated rotation angle of the DC machine 11, in order to filter out frequency components that are not relevant. The commutation frequency thus determined by way of the amplitude maximum can then be used as the "more accurately" estimated rotation angle signal SD0* for an "adaptive" bandpass filtering in block 20.

Repeated compression of the frequency axis of the intermediate signal SZ by integer factors and offsetting of the individual spectra thus obtained, for example by addition or multiplication, can be used in block 60 in this case to produce an overall spectrum, the maximum of which clearly corresponds to the rotation frequency of the DC machine 11. This mathematical method is also referred to as the harmonic product or sum spectrum.

The higher accuracy of the estimated rotation angle signal SD0* means that the bandwidth B0 around the centre frequency of the bandpass filter can be reduced, which improves the quality of the conditioned signal SK2* and therefore increases the accuracy of the (final) rotation angle signal SD* further.

In conclusion, it will be stated in regard to the cited signals SI, SU, SK1, SK2, SK2*, SD, SD*, SD0, SD0* and SM that all of these signals are time-dependent signals and can comprise time-dependent signal values, that is to say a specific number of signal values relating to specific times in a specific period of time. The number of respective signal values may be dependent on a sampling frequency at which the signals are recorded. In one exemplary arrangement, the respective sampling frequency is chosen such that the signal oscillations that occur in the respective signals are distinctly analysable. As mentioned previously, the intermediate signal SZ is a discrete-time vector signal.

The invention claimed is:

1. A method for determining a rotation angle signal of a DC machine, comprising:
    combining a current signal of the DC machine and a voltage signal of the DC machine to determine a combined signal;
    conditioning the combined signal to determine a conditioned signal, wherein the conditioning of the combined signal comprises a bandpass filtering; and
    wherein the rotation angle signal is determined by analysing signal oscillations of the conditioned signal.

2. The method according to claim 1,
    wherein the combining of the current signal and the voltage signal comprises at least one mathematical operation of addition, subtraction, multiplication and division, or combinations of these mathematical operations.

3. The method according to claim 1,
    wherein the conditioning of the combined signal is effected on a basis of an estimated rotation angle signal.

4. The method according to claim 3,
    wherein the estimated rotation angle signal is determined by modelling the current signal and the voltage signal.

5. The method according to claim 4,
    wherein the modelling of the current signal and the voltage signal comprises a mathematical model of the DC machine.

6. The method according to claim 5,
    wherein the modelling of the current signal and the voltage signal is used to determine a modelled signal.

7. The method according to claim 6,
    further comprising: preprocessing the combined signal to determine an intermediate signal, wherein the estimated rotation angle signal is determined by combining the modelled signal and the intermediate signal.

8. The method according to claim 6,
    further comprising: preprocessing of the combined signal to determine an intermediate signal.

9. The method according to claim 4,
    further comprising: preprocessing the combined signal to determine an intermediate signal.

10. The method according to claim 9,
    wherein the preprocessing of the combined signal comprises a spectral analysis.

11. The method according to claim 10,
    wherein the modelling of the current signal and the voltage signal is used to determine a modelled signal, and wherein the estimated rotation angle signal is determined by combining the modelled signal and the intermediate signal.

12. The method according to claim 9, wherein the modelling of the current signal and the voltage signal is used to determined a modelled signal, and wherein the estimated rotation angle signal is determined by combining the modelled signal and the intermediate signal.

13. A braking system for a motor vehicle, comprising an electronic control unit and at least one wheel brake having an associated electric-motor actuator,
    wherein the actuator comprises a DC machine configured to operate the wheel brake for parking braking; and
    wherein the control unit is configured to control or regulate the DC machine and to perform the steps of the method according to claim 1.

14. A program code comprising commands that, when executed by an electronic control unit, to cause a braking system to perform the method according claim 1.

\* \* \* \* \*